United States Patent
Elton (10) Patent No.: US 12,365,024 B2
(45) Date of Patent: Jul. 22, 2025

(54) DIRECT CASTING INTO DROPLET PRINTED MOLDS TO CREATE LOW SURFACE FINISH AM PARTS

(71) Applicant: LAWRENCE LIVERMORE NATIONAL SECURITY, LLC, Livermore, CA (US)

(72) Inventor: Eric S. Elton, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 40 days.

(21) Appl. No.: 18/364,315

(22) Filed: Aug. 2, 2023

(65) Prior Publication Data

US 2025/0041934 A1    Feb. 6, 2025

(51) Int. Cl.
| | |
|---|---|
| B22D 23/00 | (2006.01) |
| B22F 10/22 | (2021.01) |
| B33Y 10/00 | (2015.01) |
| B33Y 30/00 | (2015.01) |

(52) U.S. Cl.
CPC ............ *B22D 23/003* (2013.01); *B22F 10/22* (2021.01); *B33Y 10/00* (2014.12); *B33Y 30/00* (2014.12)

(58) Field of Classification Search
CPC ...... B22D 23/003; B33Y 10/00; B33Y 30/00; B22F 3/115; B22F 10/22
See application file for complete search history.

(56) References Cited

U.S. PATENT DOCUMENTS

| | | |
|---|---|---|
| 2017/0216918 A1 | 8/2017 | Orme-Marmarelis |
| 2017/0252808 A1* | 9/2017 | Myerberg ............... B33Y 10/00 |
| 2018/0009134 A1* | 1/2018 | Berben ................... B33Y 70/00 |
| 2021/0276081 A1* | 9/2021 | Atwood .................. B22F 12/20 |

FOREIGN PATENT DOCUMENTS

| | | | |
|---|---|---|---|
| CN | 109047769 A | * 12/2018 | ............... B22C 9/00 |
| JP | 2003290919 A | 10/2003 | |
| JP | 2017514725 A | 6/2017 | |
| KR | 20190095475 A | 8/2019 | |
| WO | WO-2020096951 A1 | * 5/2020 | |

OTHER PUBLICATIONS

International Search Report and Written Opinion of International Searching Authority, PCT International Application No. PCT/US2024/039567, mailed Oct. 30, 2024; ISA/KR.

* cited by examiner

*Primary Examiner* — Kevin E Yoon
*Assistant Examiner* — Jacky Yuen
(74) *Attorney, Agent, or Firm* — HARNESS, DICKEY & PIERCE, P.L.C.

(57) ABSTRACT

Various embodiments include constant pressure direct casting into molds to create low surface finish additive manufacturing parts with reduced surface roughness apparatus having a liquid metal print head, a high pressure gas supply line, a pneumatic valve between said liquid metal print head and said high pressure gas supply line, a build plate motion stage, and a stream of metal produced by said liquid metal print head that is directed onto said build plate motion stage to produce the low surface finish additive manufacturing parts with reduced surface roughness.

5 Claims, 4 Drawing Sheets

DIRECT CASTING INTO DROPLET PRINTED MOLDS TO CREATE LOW SURFACE FINISH AM PARTS

AND STATEMENT AS TO RIGHTS TO APPLICATIONS MADE UNDER AND FEDERALLY SPONSORED RESEARCH DEVELOPMENT

This invention was made with Government support under Contract No. DE-AC52-07NA27344 awarded by the United States Department of Energy. The Government has certain rights in the invention.

BACKGROUND

Field of Endeavor

The present application relates to additive manufacturing and more particularly to additive manufacturing.

State of Technology

This section provides background information related to the present disclosure which is not necessarily prior art.

Metal droplet printing is a form of additive manufacturing where droplets of liquid metal are formed and deposited onto a substrate to build metal parts droplet by droplet. There are different methods of droplet formation, but this invention is concerned with pneumatic droplet ejection, where gas pressure is used form metal droplets. Typically, high frequency pneumatic valves are used to pulse gas pressure into a crucible that contains liquid metal. The gas pressure causes the metal to eject through a small nozzle at the bottom of the crucible and form droplets. The droplets are then collected to form the final part. Metal droplet printing has two notable downsides. First, because the part is fundamentally made from many individual droplets, there always exists some porosity and inherent weakness at the droplet junctions.

While parts can be >99% dense, there is always some porosity which affects the mechanical properties of the final part. Second, the size of the metal droplet (typically ~0.5 mm) determines the surface finish of the part. While smaller droplets can be used to achieve smoother surface roughness, the use of smaller droplet significantly slows the build rate and is not desirable for overall throughput. Pneumatic droplet ejection has previously been shown to form both droplets due to pulsed gas pressure and continuous streams that break up into droplets when a constant gas pressure is applied. When a constant gas pressure is applied, translation of the part relative to the nozzle is still necessary.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

Applicant's apparatus, systems, and methods provide constant pressure direct casting into molds to create low surface finish additive manufacturing parts with reduced surface roughness apparatus having a liquid metal print head, a high pressure gas supply line, a pneumatic valve between said liquid metal print head and said high pressure gas supply line, a build plate motion stage, and a stream of metal produced by said liquid metal print head that is directed onto said build plate motion stage to produce the low surface finish additive manufacturing parts with reduced surface roughness.

Applicant's apparatus, systems, and methods provide systems for direct casting into droplet printed molds for creating low surface finish additive manufacturing parts. In various embodiments Applicant's apparatus, systems, and methods include providing a liquid metal print head; providing a high pressure gas supply line; providing a pneumatic valve between said liquid metal print head and said high pressure gas supply line; providing a build plate motion stage; using said liquid metal print head, said high pressure gas supply line, and said pneumatic valve to provide a stream of liquid metal droplets or a continuous stream of directed onto said build plate motion stage to produce the low surface finish additive manufacturing parts.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

This application describes the use of pneumatic metal droplet printers to form molds for metal casting. Direct pneumatic pressure is then used to deposit a steady stream of metal into the mold directly after printing. Under these conditions, a solid part may be formed that takes the shape of the mold. In addition, the mold may partially remelt allowing for smoother surface finishes than a directly droplet printed part. Finally, if the mold is printed from a different material than the fill material, this method would allow for the formation of coated parts. Applicant's invention has use in the rapid finishing of droplet printed parts, smoothing surface roughness of droplet printed parts, In situ creation of coatings on droplet printed metal parts, and other uses.

Figure 1A:
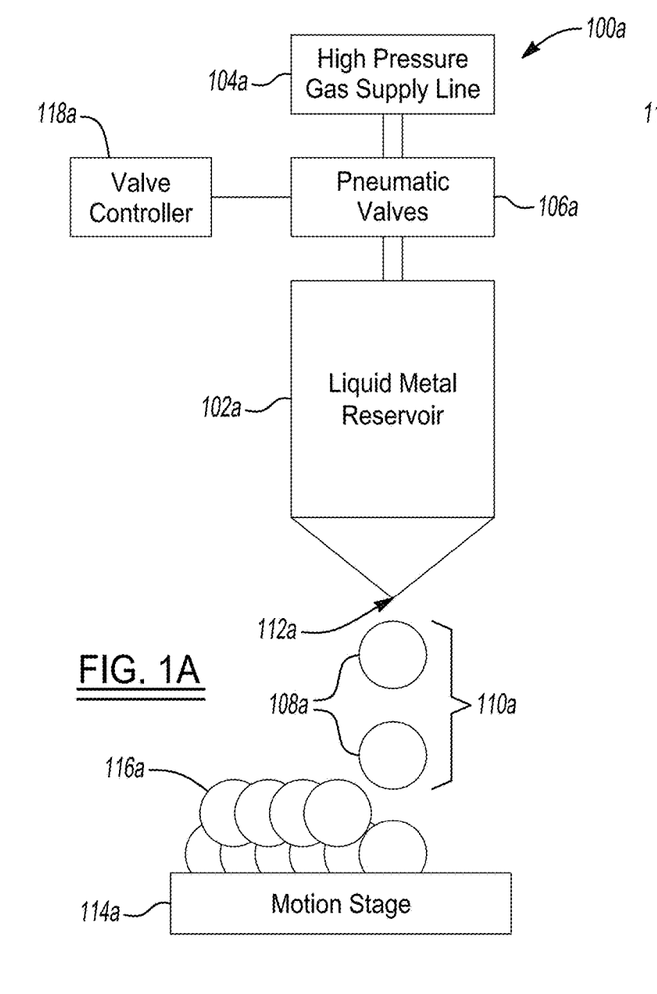
FIG. 1A is an illustration of an embodiments of the Applicant's direct casting into droplet printed molds to create low surface finish AM parts system in the "droplet mode".

Referring now to FIG. 1A, an illustrative view shows an embodiment of Applicant's direct casting into droplet printed molds to create low surface finish AM parts apparatus, systems, and methods. This embodiment shows the system in the "droplet mode" and is identified generally by the reference numeral 100a. The components of Applicant's apparatus, systems, and methods embodiment 100a illustrated in FIG. 1A are listed below:

Reference Numeral No. 102a—liquid metal reservoir,
Reference Numeral No. 104a—high pressure gas supply line,
Reference Numeral No. 106a—pneumatic valves,
Reference Numeral No. 108a—individual droplets of liquid metal,
Reference Numeral No. 110a—stream of liquid metal droplets,
Reference Numeral No. 112a—nozzle,
Reference Numeral No. 114a—build plate (Motion Stage),
Reference Numeral No. 116a—product, and
Reference Numeral No. 118a—valve controller.

The description of the components of the embodiment of Applicant's apparatus, systems, and methods 100a having been completed, the operation and additional description of the Applicant's apparatus, systems, and methods 100a will now be considered in greater detail.

The embodiment of Applicant's apparatus, systems, and methods 100a is shown in the "droplet mode" in FIG. 1A. As illustrated in FIG. 1A a Print Head/Liquid Metal Reservoir 102a uses pulsed gas pressure to create individual droplets of liquid metal 108a which are collected to build up the part.

Pneumatic valves 106a between the high pressure pulsed gas supply line 104a and the liquid metal print head 102a enables the liquid metal print head 102a to produce the droplets of liquid metal 108a that form a stream 110a of liquid metal droplets.

The stream 110a of individual droplets 108a of liquid metal exit from a nozzle 112a and are directed to a build plate (Motion Stage) 114a. The droplets of liquid metal 108a accumulate on the build plate 114a and are controlled by the Additive Manufacturing System illustrated in FIG. 1A to form product 116a.

Figure 1B:
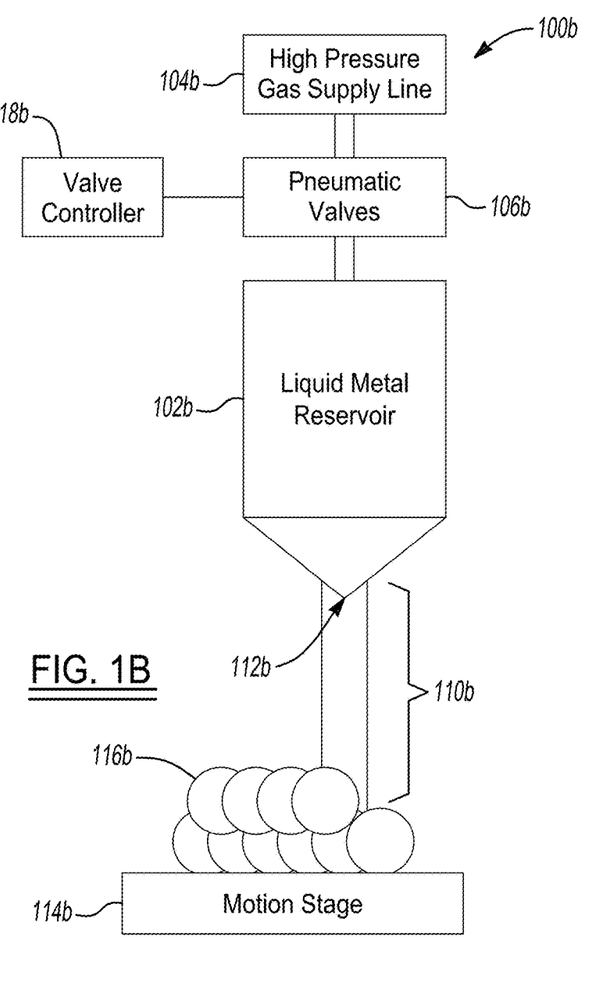
FIG. 1B is an illustration of another embodiments of the Applicant's direct casting into droplet printed molds to create low surface finish AM parts system in the "constant pressure" or "fill mode".

Referring now to FIG. 1B, an illustrative view shows another embodiment of Applicant's direct casting into droplet printed molds to create low surface finish AM parts apparatus, systems, and methods. This embodiment shows the system in the "constant pressure" or "fill mode," This embodiment is identified generally by the reference numeral 100b. The components of Applicant's apparatus, systems, and methods embodiment 100b illustrated in FIG. 1B are listed below:

Reference Numeral No. 102b—liquid metal reservoir,
Reference Numeral No. 104b—high pressure gas supply line,
Reference Numeral No. 106b—pneumatic valves,
Reference Numeral No. 110b—stream of liquid metal,
Reference Numeral No. 112b—nozzle,
Reference Numeral No. 114b—build plate (Motion Stage),
Reference Numeral No. 116b—product, and
Reference Numeral No. 118b—valve controller.

The description of the components of the embodiment of Applicant's apparatus, systems, and methods 100b having been completed, the operation and additional description of the Applicant's apparatus, systems, and methods 100*b* will now be considered in greater detail.

The embodiment of Applicant's apparatus, systems, and methods 100*b* is shown in the "constant pressure" or "fill mode" in FIG. 1B. As illustrated in FIG. 1B a Print Head/Liquid Metal Reservoir 102*b* uses pulsed gas pressure to create a stream 110*b* of liquid metal which is collected to build up the part 116*b*.

Pneumatic valves 106*b* between the high pressure pulsed gas supply line 104*b* and the liquid metal print head 102*b* enables the liquid metal print head 102*b* to produce the stream liquid metal 110*b*.

The stream 110*a* of liquid metal exist from a nozzle 112*b* and is directed to a build plate (Motion Stage) 114. The droplets stream 110*a* of liquid metal accumulate on the build plate 114*b* and is controlled by the Additive Manufacturing System illustrated in FIG. 1B to form product 116*b*.

Figure 2A:
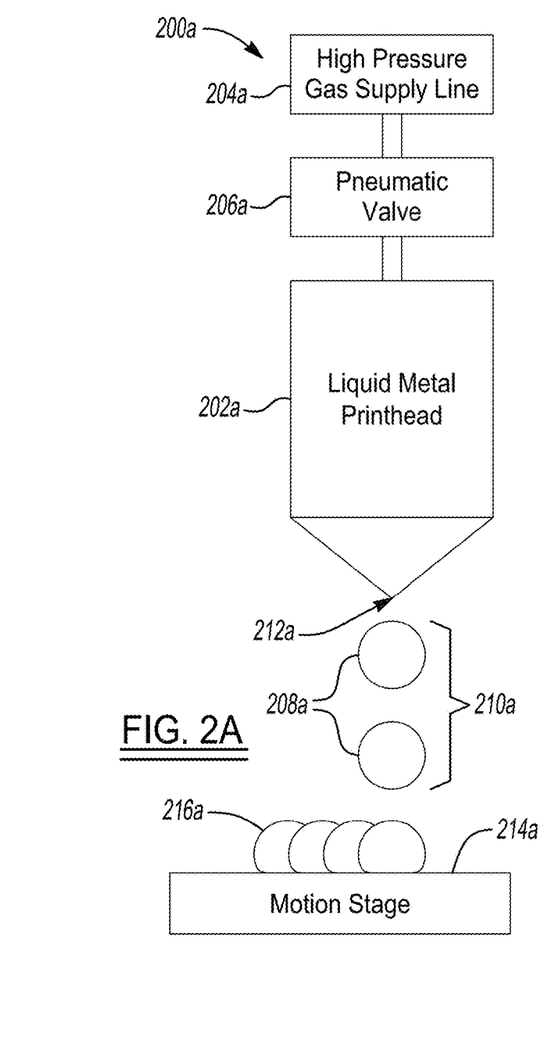
FIG. 2A is an illustration of an embodiment of the applicant's direct casting into droplet printed molds to create low surface finish AM parts system in the "droplet mode."

FIG. 2A is an illustration of an embodiment of the applicant's direct casting into droplet printed molds to create low surface finish AM parts system in the "droplet mode." This embodiment is designated generally by the reference numeral 200*a*. The components of Applicant's apparatus, systems, and methods embodiment 200*a* illustrated in FIG. 2A are listed below:

Reference Numeral No. 202*a*—liquid metal print head,
Reference Numeral No. 204*a*—high pressure gas supply line,
Reference Numeral No. 206*a*—pneumatic valve,
Reference Numeral No. 208*a*—individual droplets of liquid metal,
Reference Numeral No. 210*a*—stream of liquid metal droplets,
Reference Numeral No. 212*a*—nozzle,
Reference Numeral No. 214*a*—build plate (Motion Stage), and
Reference Numeral No. 216*a*—product.

The description of the components of the embodiment of Applicant's apparatus, systems, and methods 200*a* having been completed, the operation and additional description of the Applicant's apparatus, systems, and methods 200*a* will now be considered in greater detail.

The embodiment of Applicant's apparatus, systems, and methods 200*a* is shown in the "droplet mode" in FIG. 2A.

A liquid metal print head 202*a* uses pulsed gas pressure to create individual droplets of liquid metal 208*a* which are collected to build up the part.

A pneumatic valve 206*a* between the pulsed gas pressure 204*a* and the liquid metal print head 202*a* enables the liquid metal print head 202*a* to produce the droplets of liquid metal 208*a* that form a stream of liquid metal droplets 210*a*.

The stream of individual droplets of liquid metal 210*a* exits from a nozzle 212*a* and are directed to a build plate (Motion Stage) 214*a*.

The droplets of liquid metal 208*a* accumulate on the build plate 214*a* and are controlled by the Additive Manufacturing System illustrated in FIG. 1 to form product 216*a*.

Figure 2B:
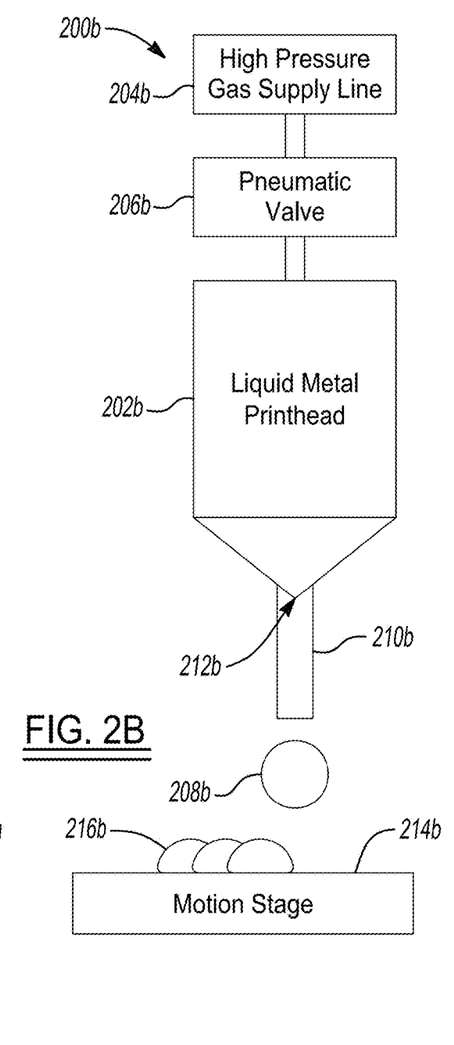
FIG. 2B is another illustration of an embodiment of the applicant's direct casting into droplet printed molds to create low surface finish AM parts system in the "droplet mode".

FIG. 2B is another illustration of an embodiment of the applicant's direct casting into droplet printed molds to create low surface finish AM parts system in the "constant pressure mode". This embodiment is designated generally by the reference numeral 200*b*. The components of Applicant's apparatus, systems, and methods embodiment 200*b* illustrated in FIG. 2B are listed below:

Reference Numeral No. 202*b*—liquid metal print head,
Reference Numeral No. 204*b*—high pressure gas supply line,
Reference Numeral No. 206*b*—pneumatic valve,
Reference Numeral No. 208*b*—individual droplet of liquid metal,
Reference Numeral No. 210*b*—stream of liquid metal,
Reference Numeral No. 212*b*—nozzle,
Reference Numeral No. 214*b*—build plate (Motion Stage), and
Reference Numeral No. 216*b*—product.

The description of the components of the embodiment of Applicant's apparatus, systems, and methods 200*b* having been completed, the operation and additional description of the Applicant's apparatus, systems, and methods 200*b* will now be considered in greater detail. The embodiment of Applicant's apparatus, systems, and methods 200*b* is shown in the "droplet mode" in FIG. 2B.

A liquid metal print head 202*b* uses constant gas pressure to create a stream of liquid metal 210*b* which breaks up into individual droplets of liquid metal 208*b* which are collected to build up the part.

The pneumatic valve 206*b* between the pulsed gas pressure 204*b* and the printer 202*b* remains open to apply a constant pressure to create the stream of liquid metal 210*b*. The stream of liquid metal 210*b* breaks up into individual droplets of liquid metal 208*b*.

The stream of liquid metal 210*b* exits from a nozzle 212*b* and is directed toward a build plate (Motion Stage) 214*b* but breaks up into individual droplets of liquid metal 208*b*.

The droplets of liquid metal 208*a* accumulate on the build plate 214*b* and are controlled by the Additive Manufacturing System illustrated in FIG. 1 to form the product 216*b*.

Figure 2C:
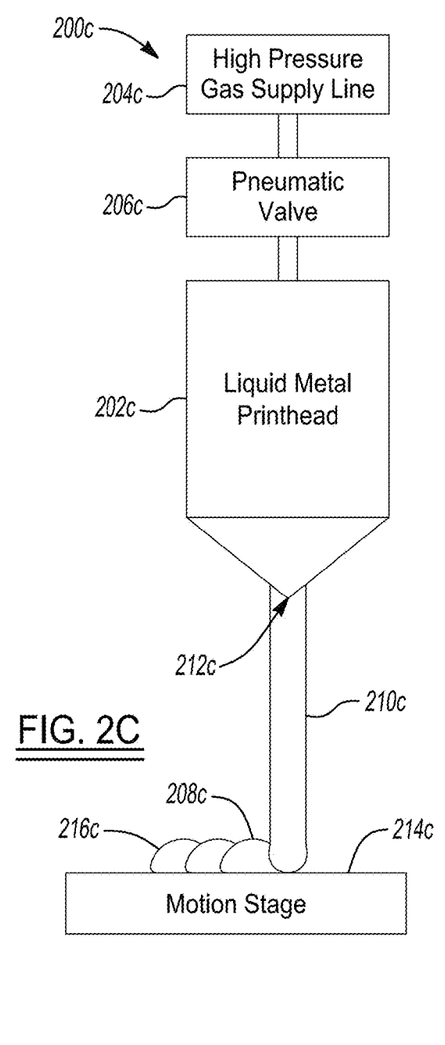
FIG. 2C is yet another illustration of an embodiment of the applicant's direct casting into droplet printed molds to create low surface finish AM parts system in the "droplet mode."

FIG. 2C is yet another illustration of an embodiment of the applicant's direct casting into droplet printed molds to create low surface finish AM parts system in the "droplet mode." This embodiment is designated generally by the reference numeral 200*c*. The components of Applicant's apparatus, systems, and methods embodiment 200*c* illustrated in FIG. 2C are listed below:

Reference Numeral No. 202*c*—liquid metal print head,
Reference Numeral No. 204*c*—high pressure gas supply line,
Reference Numeral No. 206*c*—pneumatic valve,
Reference Numeral No. 208*c*—individual droplets of liquid metal,
Reference Numeral No. 210*c*—stream of liquid metal,
Reference Numeral No. 212*c*—nozzle,
Reference Numeral No. 214*c*—build plate (Motion Stage), and
Reference Numeral No. 216*c*—product.

The description of the components of the embodiment of Applicant's apparatus, systems, and methods 200*c* having been completed, the operation and additional description of the Applicant's apparatus, systems, and methods 200*c* will now be considered in greater detail. The embodiment of Applicant's apparatus, systems, and methods 200*c* is shown in the "constant pressure mode" in FIG. 2C.

A liquid metal print head 202*c* uses constant gas pressure to create a stream of liquid metal 210*c* which is directed onto the build plate (Motion Stage) 214*c*.

Once the stream of liquid metal 210*c* is on the build plate (Motion Stage) 214*c* it breaks up into individual droplets of liquid metal 208*c* which produce the part.

The pneumatic valve 206*c* between the pulsed gas pressure 204*c* and the printer 202*c* remains open to apply a constant pressure to create the stream of liquid metal 210*c*.

The stream of liquid metal 210*c* exits from a nozzle 212*c* and is directed onto the build plate (Motion Stage) 214*c*. Once it is on the build plate (Motion Stage) 214*c* it breaks up into individual droplets of liquid metal 208*b*.

The droplets of liquid metal 208a accumulated on the build plate 214b are controlled by the Additive Manufacturing System illustrated in FIG. 1 to form the product 216c.

Figure 3A:
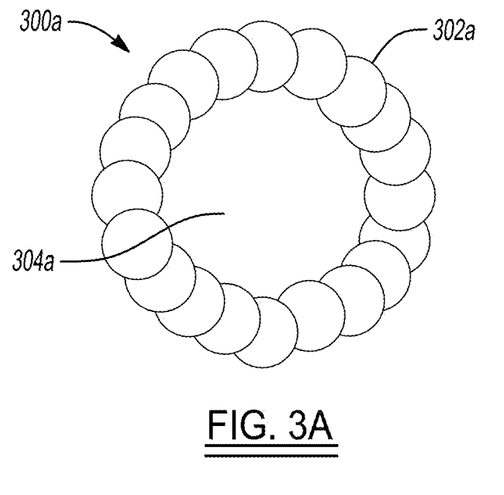
FIG. 3A is an illustration of an embodiment of an unfilled mold of the applicant's direct casting into droplet printed molds to create low surface finish AM parts system in the constant pressure mode.

FIG. 3A is an illustration of an embodiment of the Applicant's unfilled mold of Applicant's direct casting into droplet printed molds to create low surface finish AM parts system. This embodiment is designated generally by the reference number 300a. The components of Applicant's apparatus, systems, and methods embodiment 300a illustrated in FIG. 3A are listed below:

Reference Numeral No. 302a—mold, and
Reference Numeral No. 304a—fill.

The description of the components of the embodiment of Applicant's apparatus, systems, and methods 300a having been completed, the operation and additional description of the Applicant's apparatus, systems, and methods 300a will now be considered in greater detail.

This embodiment of Applicant's apparatus, systems, and methods 300a illustrated in FIG. 3A shows a top view of mold 302a. The outside surface is rough. The mold 302a is produced using the "droplet mode" as illustrated in FIG. 2A. The interior 304a will be filled as explained subsequently.

Figure 3B:
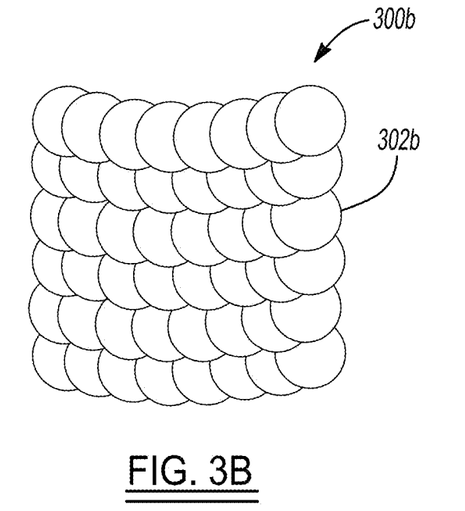
FIG. 3B is another illustration of an embodiment of an unfilled mold the applicant's direct casting into droplet printed molds to create low surface finish AM parts system in the constant pressure mode.

FIG. 3B is an illustration of an embodiment of the Applicant's unfilled mold of Applicant's direct casting into droplet printed molds to create low surface finish AM parts system. This embodiment is designated generally by the reference numeral 300b. The components of Applicant's apparatus, systems, and methods embodiment 300b illustrated in FIG. 3B are listed below:

Reference Numeral No. 302a—mold.

The description of the components of the embodiment of Applicant's apparatus, systems, and methods 300b having been completed, the operation and additional description of the Applicant's apparatus, systems, and methods 300b will now be considered in greater detail.

This embodiment of Applicant's apparatus, systems, and methods 300a illustrated in FIG. 3B shows a side view of the mold 302a. The outside surface is rough. The mold 302a is produced using the "droplet mode" as illustrated in FIG. 2A.

Figure 4A:
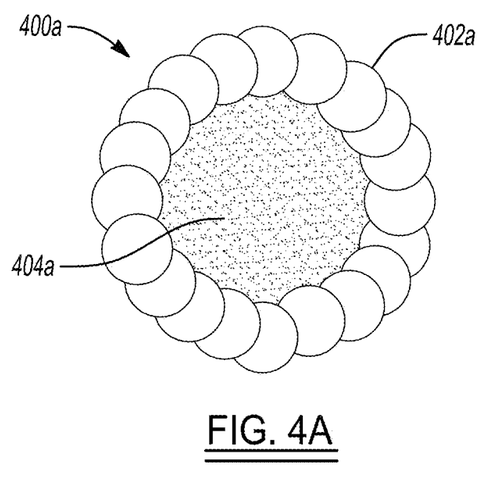
FIG. 4A is an illustration of an embodiment of a filled mold of the applicant's direct casting into droplet printed molds produced using the "constant pressure mode."

FIG. 4A is an illustration of a filled mold of an embodiment of Applicant's direct casting into droplet printed molds to create low surface finish AM parts system. This embodiment is designated generally by the reference numeral 400a. The components of Applicant's apparatus, systems, and methods embodiment 400a illustrated in FIG. 4A are listed below:

Reference Numeral No. 402a—mold, and
Reference Numeral No. 404a—fill.

The description of the components of the embodiment of Applicant's apparatus, systems, and methods 400a having been completed, the operation and additional description of the Applicant's apparatus, systems, and methods 400a will now be considered in greater detail.

This embodiment of Applicant's apparatus, systems, and methods 400a illustrated in FIG. 4A shows at top view of the mold 402a. The outside surface is rough. The mold 402a is produced using the "constant pressure mode" as illustrated in FIGS. 2B and 2C. The interior 404a will be filled as explained subsequently.

Figure 4B:
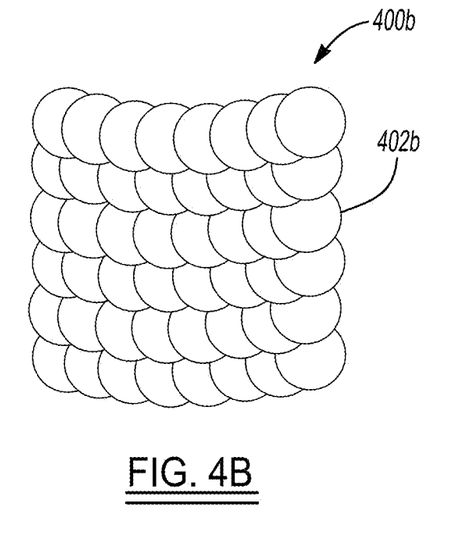
FIG. 4B is another illustration of an embodiment of a filled mold of the applicant's direct casting into droplet printed molds produced using the "constant pressure mode."

FIG. 4B is an illustration of an embodiment of a filled mold of an embodiment of Applicant's direct casting into droplet printed molds to create low surface finish AM parts system. This embodiment is designated generally by the reference numeral 400b. The components of Applicant's apparatus, systems, and methods embodiment 400b illustrated in FIG. 4B are listed below:

Reference Numeral No. 402a—mold.

The description of the components of the embodiment of Applicant's apparatus, systems, and methods 400b having been completed, the operation and additional description of the Applicant's apparatus, systems, and methods 400b will now be considered in greater detail.

This embodiment of Applicant's apparatus, systems, and methods 400a illustrated in FIG. 4B shows a side view of the mold 402a. The outside surface is rough. The mold 402a is produced using the "constant pressure mode" as illustrated in FIGS. 2B and 2C.

Figure 5A:
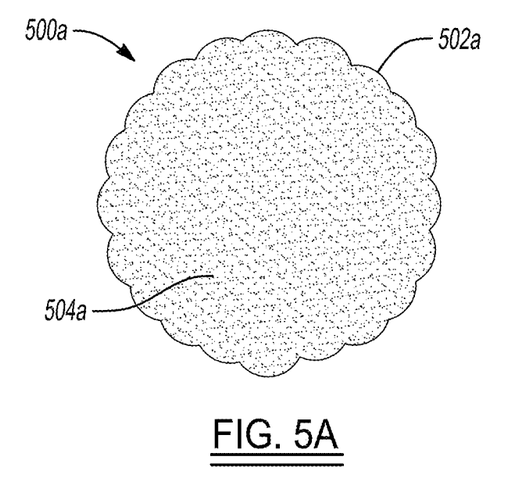
FIG. 5A is an illustration of an embodiment of the applicant's direct casting into droplet printed molds where the interior has been filled with the same hot metal material A.

FIG. 5A is an illustration of an embodiment of the applicant's direct casting into droplet printed molds to create low surface finish AM parts system. This embodiment is designated generally by the reference numeral 500a. The components of Applicant's apparatus, systems, and methods embodiment 500a illustrated in FIG. 5A are listed below:

Reference Numeral No. 502a—mold,
Reference Numeral No. 502b—outer surface, and
Reference Numeral No. 504A—fill.

The description of the components of the embodiment of Applicant's apparatus, systems, and methods 500a having been completed, the operation and additional description of the Applicant's apparatus, systems, and methods 500a will now be considered in greater detail.

This embodiment of Applicant's apparatus, systems, and methods 500a illustrated in FIG. 5A shows a top view of the mold 502a. The mold 502a is produced using the "droplet mode" as illustrated in FIG. 2A. The mold 502a is made of a hot metal material A. The interior 504A has been filled with the same hot metal material A. This provides partial melting of the surface 502b resulting in a lower surface roughness.

Figure 5B:
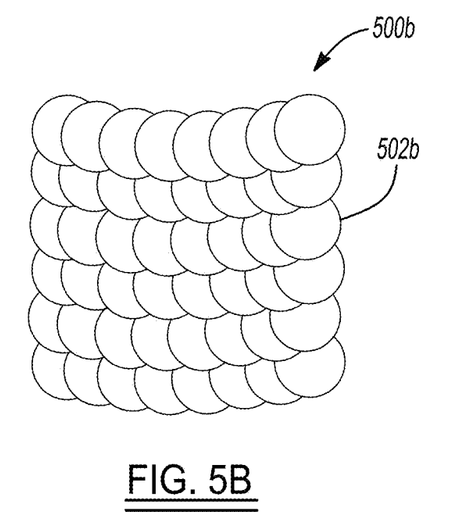
FIG. 5B is another illustration of an embodiment of the applicant's direct casting into droplet printed molds where the interior has been filled with the same hot metal material A.

FIG. 5B is an illustration of an embodiment of the applicant's direct casting into droplet printed molds to create low surface finish AM parts system. This embodiment is designated generally by the reference numeral 500b. The components of Applicant's apparatus, systems, and methods embodiment 500b illustrated in FIG. 5B are listed below:

Reference Numeral No. 502a—mold.

The description of the components of the embodiment of Applicant's apparatus, systems, and methods 500b having been completed, the operation and additional description of the Applicant's apparatus, systems, and methods 500b will now be considered in greater detail.

This embodiment of Applicant's apparatus, systems, and methods 500a illustrated in FIG. 5B shows a side view of the mold 502a. The mold 502a is filled using the "constant pressure mode" as illustrated in FIGS. 2B and 2C.

The interior of the mold 502a has been filled with a hot metal that provides partial melting of the surface 502b resulting in a lower surface roughness.

Figure 6A:
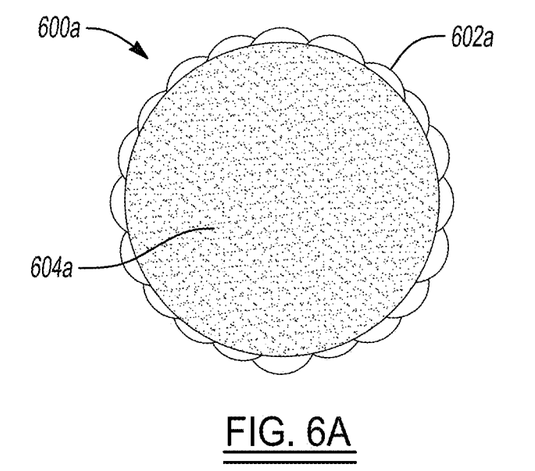
FIG. 6A is an illustration of an embodiment of the applicant's direct casting into droplet printed molds wherein the mold is made of a first material A and the interior has been filled with a hot metal material second material "material B."

FIG. 6A is an illustration of an embodiment of the applicant's direct casting into droplet printed molds to create low surface finish AM parts system. This embodiment is designated generally by the reference numeral 600a. The components of Applicant's apparatus, systems, and methods embodiment 600a illustrated in FIG. 6A are listed below:

Reference Numeral No. 602a—mold
Reference Numeral No. 602b—outer surface, and
Reference Numeral No. 604A—fill.

The description of the components of the embodiment of Applicant's apparatus, systems, and methods 600a having been completed, the operation and additional description of the Applicant's apparatus, systems, and methods 600a will now be considered in greater detail.

This embodiment of Applicant's apparatus, systems, and methods 600a illustrated in FIG. 6A shows a top view of the mold 602a. The mold 602a is produced using the "droplet mode" as illustrated in FIG. 2A. The mold 602a is made of a first material A.

The interior 604A has been filled with a hot metal material, second material "material B." This provides partial melting of the surface 502b resulting in a lower surface roughness.

Figure 6B:
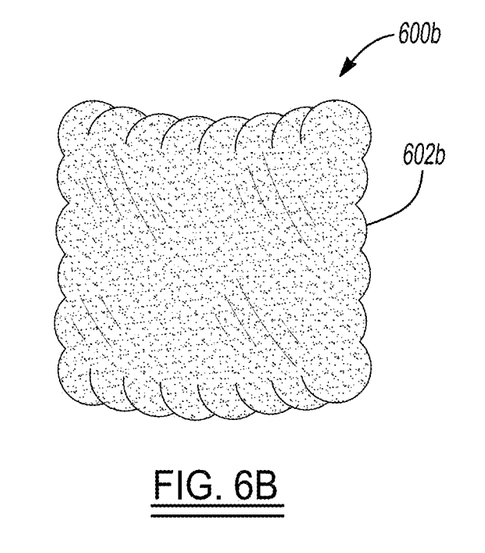
FIG. 6B is another illustration of an embodiment of applicant' direct casting into droplet printed molds wherein the mold is made of a first material A and the interior has been filled with a hot metal material second material "material B."

FIG. 6B is an illustration of an embodiment of the applicant's direct casting into droplet printed molds to create low surface finish AM parts system. This embodiment is designated generally by the reference numeral 600b. The components of Applicant's apparatus, systems, and methods embodiment 600b illustrated in FIG. 6B are listed below:

Reference Numeral No. 602a—mold.

The description of the components of the embodiment of Applicant's apparatus, systems, and methods 600b having been completed, the operation and additional description of the Applicant's apparatus, systems, and methods 600b will now be considered in greater detail.

This embodiment of Applicant's apparatus, systems, and methods 600b illustrated in FIG. 6B shows a side view of the mold 602a. The mold 602a is produced using the "droplet mode" as illustrated in FIG. 2A. The mold 602a is made of a first material A. The interior 604A has been filled with a hot metal material, second material "material B." This provides partial melting of the surface 602b resulting in a lower surface roughness.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each, and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for direct casting into a mold, wherein the mold is adapted to create low surface finish additive manufacturing parts with reduced surface roughness in a subsequent casting operation, the apparatus, comprising:
   a valve controller;
   a liquid metal print head,
   a high pressure gas supply line,
   a pneumatic valve between said liquid metal print head and said high pressure gas supply line, and being responsive to the valve controller,
   a build plate motion stage, and
   the valve controller being configured to control the liquid metal print head to produce a stream of metal that is directed onto said build plate motion stage to produce the mold by metal droplets created from the stream of metal while falling toward the build plate motion stage, or upon landing on the build plate motion stage; and
   the valve controller further being controlled to cause the liquid metal print head to produce an additional stream of metal to fill the mold once the mold is formed, and to heat an interior surface of the mold sufficiently to cause heat to permeate from the interior surface through to an outer surface of the mold, for a sufficient time, such that the heat partially melts an outer surface of the mold, wherein the melting of the outer surface of the mold smooths the outer surface to produce a reduced surface roughness of the outer surface of the mold.

2. The apparatus of claim 1, wherein said stream of metal comprises a stream of aluminum metal.

3. The apparatus of claim 1, wherein the mold comprises an aluminum mold, and wherein said stream of metal comprises a stream of aluminum metal.

4. The apparatus of claim 1, wherein the mold comprises an aluminum mold, and wherein the apparatus is further configured to deposit a stream of copper metal into the aluminum mold.

5. A method for direct casting into a droplet printed mold for creating low surface finish additive manufacturing parts, the method comprising the steps of:
   providing a liquid metal print head;
   providing a high pressure gas supply line;
   providing a pneumatic valve between said liquid metal print head and said high pressure gas supply line;

providing a build plate motion stage;
using said liquid metal print head, said high pressure gas supply line, and said pneumatic valve to provide a stream of metal directed onto said build plate motion stage; and
the pneumatic valve further being controlled to produce the stream of metal:
  such that the stream of metal remains as a stream while falling until landing on the build plate or until landing upon on previously deposited molten metal present on the build plate, whereupon the stream breaks into droplets to form the mold, or
  such that the stream forms droplets immediately upon exiting the liquid metal print head, whereupon the droplets form the mold; and
  subsequently performing a casting operation to fill the mold with an additional quantity of molten metal sufficient in temperature, and for a sufficient time, such that heat from the additional quantity of molten metal permeates through an inner wall of the mold to an outer wall, and remains sufficient in temperature to re-melt an outer surface of the mold to reduce surface roughness on the outer surface of the mold.

* * * * *